Jan. 2, 1923.
F. C. RAUB.
CONNECTOR.
FILED MAR. 30, 1922.
1,440,628
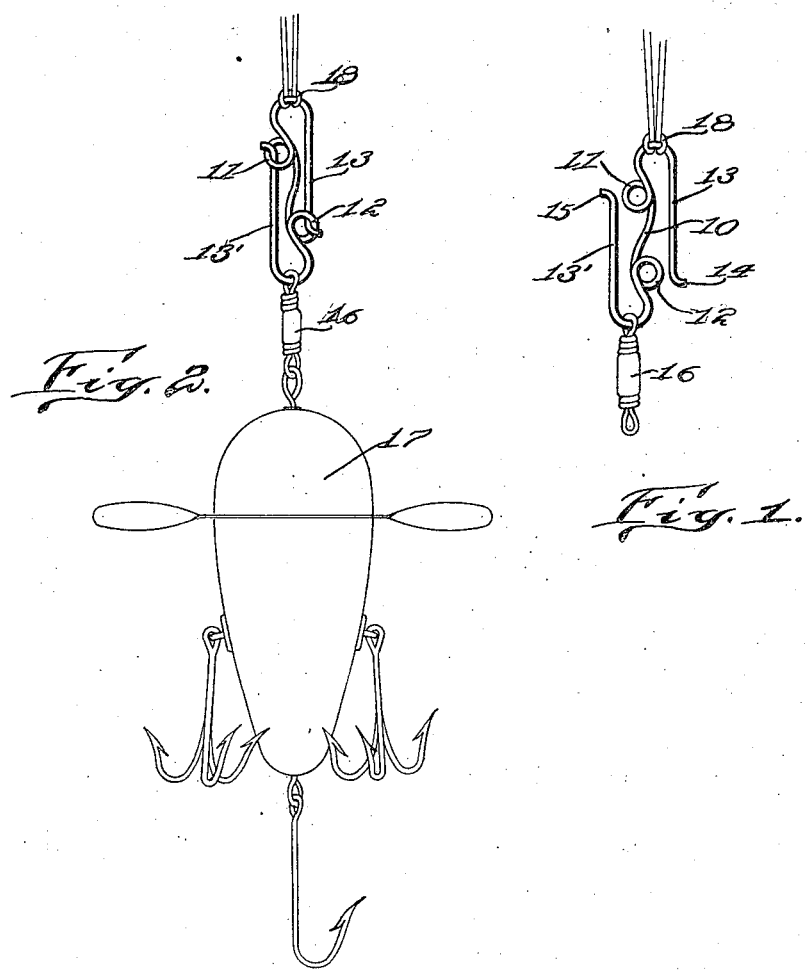
Inventor:
Floyd C. Raub
by Geo. K. Woodworth
Atty.

Patented Jan. 2, 1923.

1,440,628

UNITED STATES PATENT OFFICE.

FLOYD C. RAUB, OF CONCORD, NEW HAMPSHIRE.

CONNECTOR.

Application filed March 30, 1922. Serial No. 547,953.

*To all whom it may concern:*

Be it known that I, FLOYD C. RAUB, a citizen of the United States, and a resident of Concord, in the county of Merrimack and State of New Hampshire, have invented a new and useful Improvement in Connectors, of which the following is a specification.

My invention relates to connectors or devices for attaching lines to artificial baits, trolling spoons and the like, or ropes to boat anchors, etc.

The object of my invention is to provide a connector which will afford a means for quickly attaching a line or rope to, and detaching the same from, an object without requiring the use of knots or the cutting of the line or rope.

With this object in view my invention comprises a wire of resilient material bent to form two separated loops at points intermediate the ends thereof, said loops preferably oppositely disposed, and having its end portions beyond said loops reversely bent to form oppositely-directed shanks each terminating near the loop which is the farther from its inner end and being constructed and arranged to snap into such loop, each preferably having a hook or laterally-extending projection on its free end.

One embodiment of my invention is shown in the drawings accompanying and forming a part of this specification, in which—

Figure 1 is a plan view of my improved connector shown in open position; and

Fig. 2 is a plan view of the same shown in closed position and represented as connecting an artificial bait with a line or leader.

In the particular drawings selected for more fully disclosing my invention, 10 represents the central portion of my connector formed from a wire of resilient material such as spring steel, said portion being bent to form the oppositely disposed loops 11, 12 arranged near the ends thereof. The said central portion terminates in the reversely-bent oppositely-directed shanks 13, 13', each said shank being substantially parallel to the central portion and having its free end terminating near the loop which is the farther from its inner end, and each shank being constructed and arranged to snap into such loop. Preferably the free ends of the shanks are provided with the laterally extending projections 14, 15 which as shown in Fig. 2 enter the loops and are maintained therein by the resiliency of the material from which the connector is formed.

As indicated in Fig. 2 in outline the shank 13' is passed through the eye of the swivel 16 connected to the artificial bait 17, and is then snapped into the loop 11.

The shank 13 is then passed through a loop 18 in the end of the line or leader and is then locked in position in the loop 12.

As is well understood many types of artificial bait are not provided with, and do not require, swivels, thus making it necessary to attach the same to a line by tying, and to remove them therefrom by cutting the line.

It will be obvious that by means of my improved connector, such artificial bait can be more conveniently and more quickly attached to and detached from a line than heretofore, and that it obviates the necessity of cutting off the end portion of the line every time such bait is detached therefrom, this being a factor of considerable importance, especially in the case of high-grade waterproof enameled silk lines.

For bait casting and other kinds of fishing at night my improved connector has the special advantage that it eliminates all difficulties connected with knot-tying in the dark.

As will be obvious I do not limit myself to the particular construction shown in the drawings and described herein, inasmuch as my connector can be made of heavy stock to sustain a heavy weight, and may be used for a variety of purposes, such for example, as attaching a boat anchor to a rope or cord.

Having thus described an illustrative embodiment of my invention without however limiting the same thereto, what I claim and desire to secure by Letters Patent is:—

1. A connector comprising a central portion of resilient material provided with loops arranged near its respective ends and terminating in reversely-bent oppositely-directed shanks, each said shank being substantially parallel to said central portion and having a laterally-extending projection on the free end thereof arranged to snap into one of said loops.

2. A connector comprising a central portion of resilient material provided with oppositely disposed loops arranged near its respective ends and terminating in reversely-bent oppositely-directed shanks, each said shank being substantially parallel to said central portion and having a laterally-extending projection on the free end thereof arranged to snap into one of said loops.

3. A wire of resilient material bent to form two separated loops at points intermediate the ends thereof and having its end portions beyond said loops reversely bent to form oppositely-directed shanks, each said shank terminating near the loop which is the farther from its inner end and being constructed and arranged to snap into such loop.

4. A wire of resilient material bent to form two separated oppositely disposed loops at points intermediate the ends thereof and having its end portions beyond said loops reversely bent to form oppositely-directed shanks, each said shank terminating near the loop which is the farther from its inner end and being constructed and arranged to snap into such loop.

In testimony whereof, I have hereunto subscribed my name this 28th day of March, 1922.

FLOYD C. RAUB.